May 11, 1943.                R. T. BECKMANN                2,318,661
                            THRESHING MACHINE
                           Filed Aug. 13, 1942            4 Sheets-Sheet 1
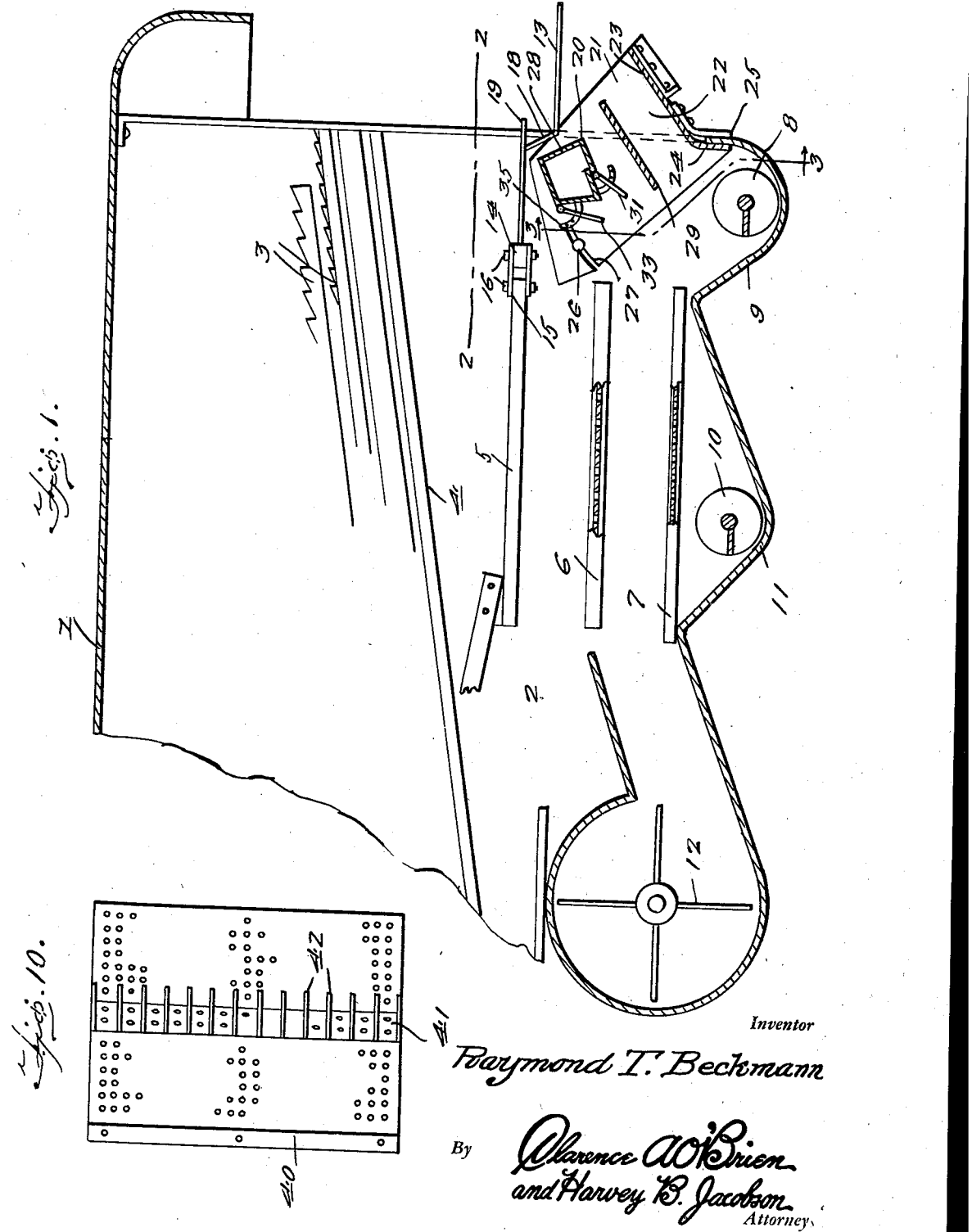
Inventor
Raymond T. Beckmann May 11, 1943. R. T. BECKMANN 2,318,661
THRESHING MACHINE
Filed Aug. 13, 1942 4 Sheets-Sheet 2
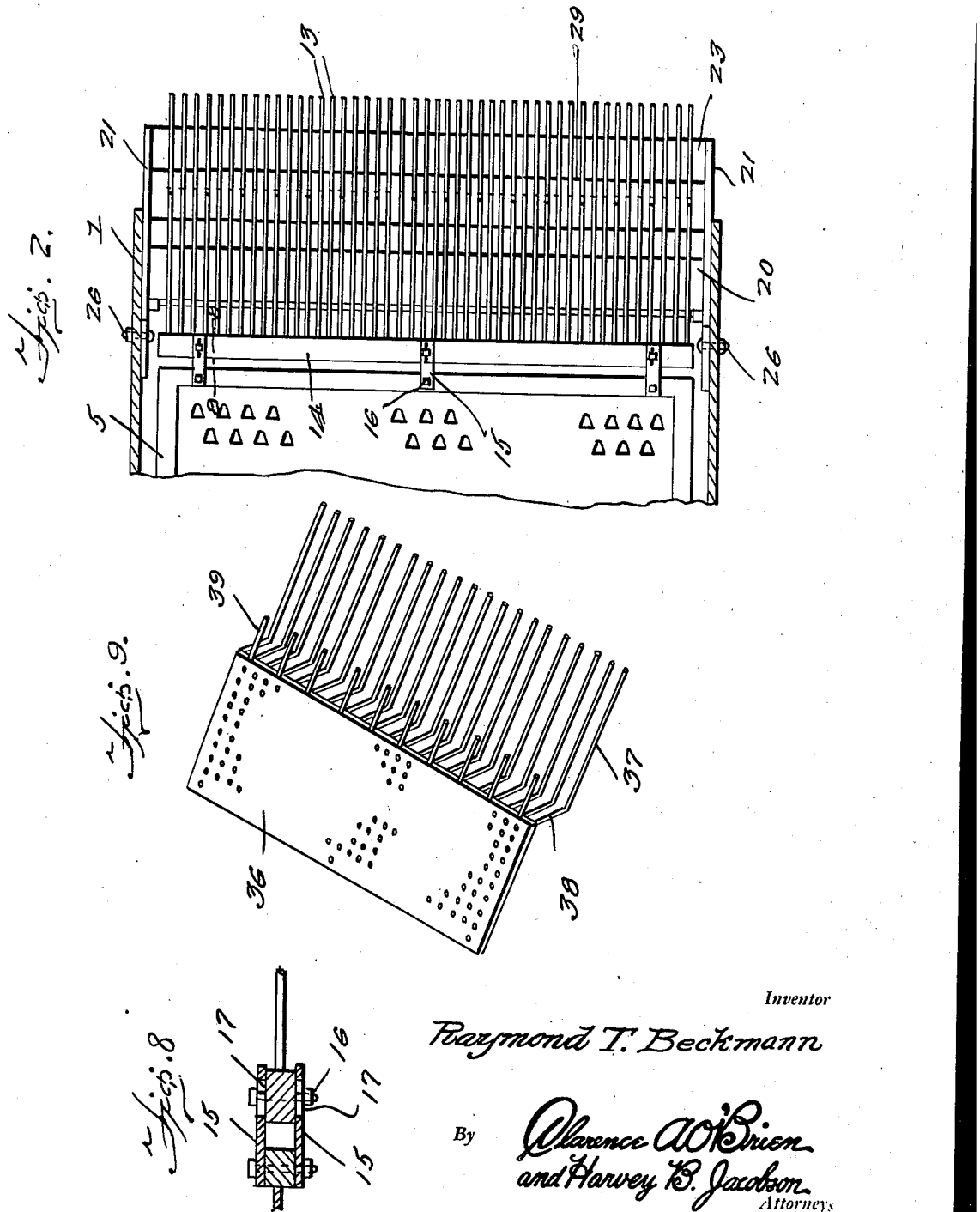

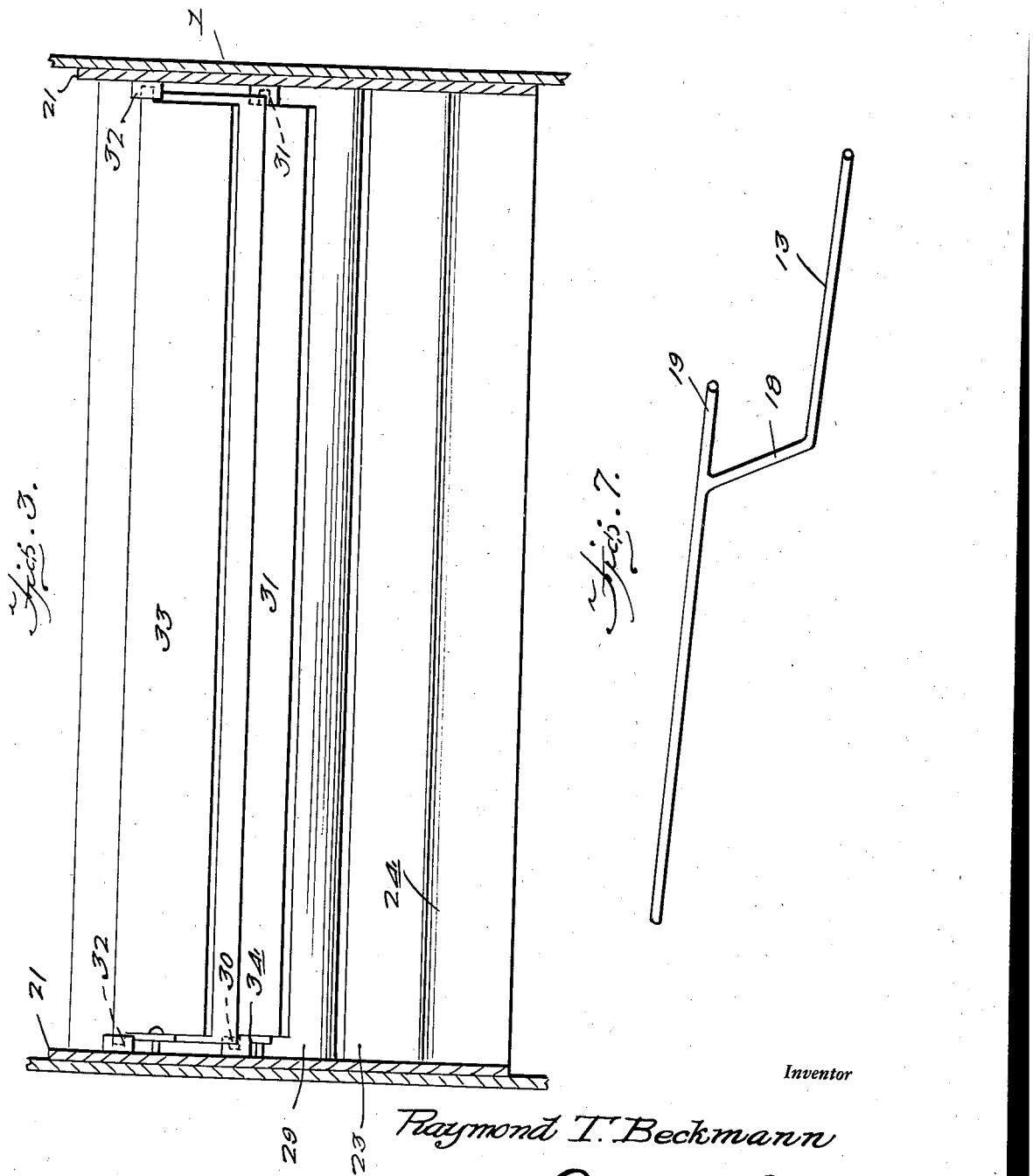

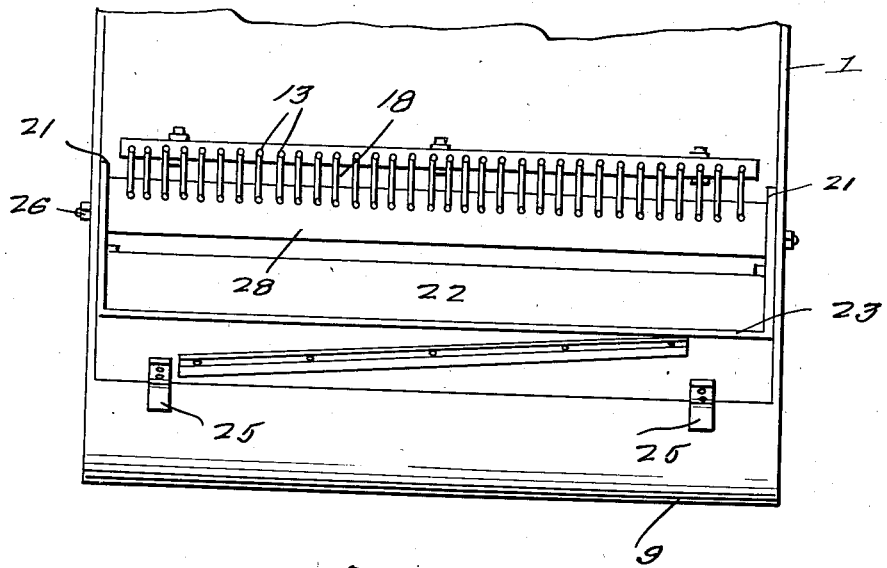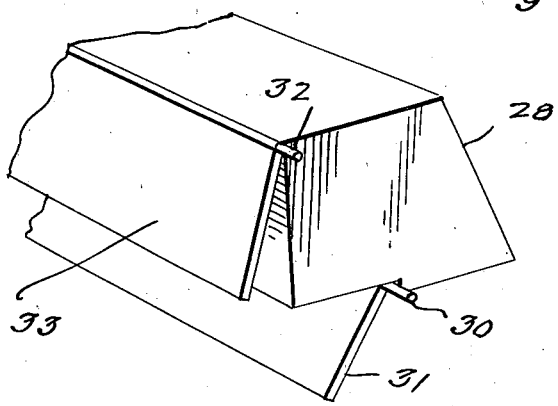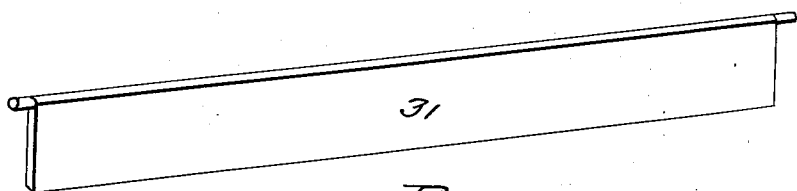

Patented May 11, 1943

2,318,661

UNITED STATES PATENT OFFICE 2,318,661

THRESHING MACHINE

Raymond T. Beckmann, Kiel, Wis., assignor of one-half to Roland E. Beckmann, Kiel, Wis.

Application August 13, 1942, Serial No. 454,714

5 Claims. (Cl. 130—27)

My invention relates to improvements in threshing machines more particularly, although not necessarily, of the so-called combine type.

By way of explanation, in practically all types of threshing machines, when the crop is heavy, as with weeds, long green clover, alfalfa, and also from being over-ripe, the chaffer will load up with a heavy layer of chaff and grain so that proper separation is not obtained and much good grain will be carried along with the chaff over the tailings rake to fall onto the ground and be lost. This condition is aggravated if air delivered by the fanning mill in the machine is properly regulated to keep the layer of chaff and grain nearly lifted or floating to provide for proper separation, the quantity of grain being lost increasing under such conditions.

Having the foregoing in mind, it is the principal object of my invention to equip threshing machines inexpensively with efficient means for obtaining separation of the grain from the chaff under all conditions of the harvest, and which may be easily incorporated in present day threshing machines without necessitating extensive alterations in the basic structure thereof.

Other and subordinate objects are also comprehended by my invention, all of which, together with the precise nature of my improvements, will be readily understood when the succeeding description and claims are read with reference to the drawings accompanying and forming part of this specification.

In said drawings:

Figure 1 is a fragmentary view in vertical longitudinal section of a threshing machine equipped according to my invention, Figure 2 is a fragmentary view in horizontal section taken on the line 2—2 of Figure 1, Figure 3 is a view in vertical transverse section taken on the line 3—3 of Figure 1 and drawn to an enlarged scale, Figure 4 is a view in rear elevation, Figure 5 is a fragmentary view in perspective of the air blast control, Figure 6 is a similar view of one of the swingable baffle members, Figure 7 is a view in perspective of one of the tines of the tailings rake, Figure 8 is a detail view in transverse section taken on the line 8—8 of Figure 2 and drawn to an enlarged scale, Figure 9 is a view in perspective of a modified form of tailings rake, and Figure 10 is a view in top plan of another modified form of tailings rake.

Referring to the drawings by numerals, my improvements have been shown therein as embodied in a well known type of threshing machine, conventionally illustrated as sufficient for the present purposes, and including the housing 1 forming the separating chamber 2. The housing contains the usual upwardly and rearwardly inclined vibratory straw racks 3 with the subjacent pan assembly 4 overlying the horizontal, adjustable upper chaffer 5 beneath which are located the intermediate and lower sieves 6, 7. In the bottom of the housing 1 at the rear end thereof and spaced rearwardly beyond the chaffer 5 and sieves 6, 7 is the tailings auger 8 operating in a transversely extending tailings trough 9 to return the tailings to the tailings feed spout, not shown. Below the lowest sieve 7 is the grain auger 10 operating in a bottom trough 11 to return grain to the usual storage bin, not shown. In front of the chaffer 5 and sieves 6 and 7 is the cleaner fan 12 operating to direct the air blast upwardly and rearwardly through the chaffer 5 and said sieves and out of the rear of the housing 1 which, as will be understood, is open at its rear end.

According to my invention, a tailings rake, or comb, is provided comprising a plurality of rod-like tines 13 extending in laterally spaced parallel relation rearwardly of the chaffer 5 and out of the rear end of the housing 1. The tines 13 are suitably secured at front ends thereof in a cross bar 14 secured to the rear end of the chaffer 5 by means of pairs of upper and lower links 15 and bolts 16. The upper links 15, as best shown in Figure 8, likewise the lower links, are slotted, as at 17, to accommodate bolts 16 and so that the rake 2 is adjustable forwardly and rearwardly of the chaffer 5 into different set positions. The tines 13 are formed with intermediate downwardly and rearwardly extending sections 18 substantially at the rear end of the housing 1 which form a grate-like prop in the tailings rake for a purpose to be described. As best shown in Figure 7, each tine 13 has a short extension 19 projecting rearwardly above the section 18 and the purpose of which will presently appear.

An elongated box-like baffle 20 extends horizontally and transversely across the housing 1 beneath the tailings rake and has its ends suitably secured to the upstanding sides 21 of a substantially U-shaped yoke 22. The bottom 23 of the yoke 22 has a downturned flange 24 coacting with clips 25 on said bottom to straddle the rear edge of the trough 9 whereby said yoke is supported by said trough. Bolts 26 passing through slots 27 into sides 21 of said yoke and through the sides of the housing 1 provide for securing the upper portions of the sides 21 to said housing. The yoke 22 is adapted for rocking adjustment forwardly and rearwardly on the trough 9 and to be clamped in different adjusted positions by the bolts 26 to vary the position of the baffles 20 relative to the tailings rake as desired. The baffle 20 embodies a straight rear wall 28 spaced forwardly of and closely adjacent to the described drop formed by the sections 18 of the tailings rake. This wall 28 together with the sections 18 form the passageway in the rear of the baffle 20 through which grain from the tailings rake may fall to find their way into the tailings auger trough 9.

Extending between the sides 21 of the yoke 22 and below the baffle 20 is a baffle plate 29 inclining upwardly and rearwardly from a point above the trough 9 past the drop forming sections 18 of the trailings rake. Conversely, said baffle plate 29 inclines downwardly and forwardly to direct grain falling through the passage between the wall 28 and sections 18 toward the trough 9. As best shown in Figure 1, the yoke 22 extends well under the rear ends of the tines 13 and slants downwardly and forwardly to the trough 9 to catch grain falling from the rear end of the tailings rake and direct the same into the trough 9.

Hinged, as at 30, to the sides 21 of the yoke 22 directly below the baffle 20 is a depending baffle 31 for partially closing, in variable degree, the space between the bottom of the baffle 20 and the baffle plate 29. Similarly hinged, as at 32, at an upper front corner of the baffle 20 is another swingable, depending baffle 33 adjustable forwardly and upwardly to variably close the space between the top of said baffle 20 and the front portion of the tailings rake. As will be understood, the baffles 31 and 33 extend clear across the yoke 22 and suitable detents, as represented at 34 and 35, may be provided for setting the baffles in different adjusted positions.

The operation of the described invention will be readily understood. The good grain may fall from the tailings rake through the space between the rear wall 28 of the baffle 20 and the described drop in said rake protected from the air blast from the cleaner fan 12 so that it will not be blown out of the rear end of the housing. By adjusting the baffle 33 upwardly toward the tailings rake the air blast against the chaff and tailings after it leaves the chaffer 5 may be controlled as occasion may require. By adjusting the baffle 31 downwardly and rearwardly to variably close the space between the bottom of the baffle 20 and the baffle plate 29, the air blast against the rear portion of the tailings rake may be similarly controlled to prevent grain from being blown upwardly and rearwardly off said rake. By virtue of the extensions 19 of the tines 13 the longer chaff will be carried back further than fine chaff to facilitate escape of good grain from the chaff so that it may drop down behind the baffle 20.

In the modified form of the invention shown in Figure 9 the tailings rake comprises a rectangular perforated plate 36 having rod-like tines 37 extending from the rear edge thereof in laterally spaced relation and provided with front sections 38 similar to sections 18 and for the same purpose. Prongs 39 extend from the rear edge of the plate 36 in lieu of the previouslly described extensions 19. This form of tailings rake is especially adapted for separation of small seed from the chaff where the harvest is infested with heavy green weeds.

In the modified form shown in Figure 10, the tailings rake is formed of a perforated plate 40 having a central drop 41 and rearwardly extending prongs 42 corresponding to extensions 19 and prongs 39. This form of tailings rake is better adapted for very fine seed, as will be obvious.

The foregoing will, it is believed, suffice to impart a clear understanding of my invention without further explanation.

Manifestly, the invention, as described, is susceptible of modification in other respects than as heerin disclosed, and right is reserved to such modifications as fall within the scope of the appended claims.

What I claim is:

1. In a thresher, the combination with a housing having an open rear end, a horizontal chaffer spaced inwardly from said end, a tailings trough at the bottom and rear end of said housing, and a cleaner fan for directing an air blast upwardly and rearwardly relative to said chaffer and out of said end, of a tailings rake extending rearwardly from said chaffer out of said rear end, and having an intermediate downwardly and rearwardly inclined drop extending across the housing, and means in said housing forming with said drop a passageway for grain to drop through protected from said air blast to find its way to said trough.

2. In a thresher, the combination with a housing having an open rear end, a horizontal chaffer spaced inwardly from said end, a tailings trough at the bottom and rear end of said housing, and a cleaner fan for directing an air blast upwardly and rearwardly relative to said chaffer and out of said end, of a tailings rake extending rearwardly from said chaffer out of said rear end, and having an intermediate downwardly and rearwardly inclined drop extending across the housing, and means in said housing forming with said drop a passageway for grain to drop through protected from said air blast to find its way to said trough, said means comprising an elongated box-like baffle extending transversely of said housing beneath said rake and spaced forwardly of said drop, and a baffle hinged to said first baffle in advance of said passageway for upward swinging toward said rake to vary the air blast against said rake in advance of said passageway and prevent grain from being lifted by said blast off the rake in advance of the passageway.

3. In a thresher, the combination with a housing having an open rear end, a horizontal chaffer spaced inwardly from said end, a tailings trough at the bottom and rear end of said housing, and a cleaner fan for directing an air blast upwardly and rearwardly relative to said chaffer and out of said end, of a tailings rake extending rearwardly from said chaffer out of said rear end, and having an intermediate downwardly and rearwardly inclined drop extending across the housing, and means in said housing forming with said drop a passageway for grain to drop through protected from said air blast to find its way to said trough, said means comprising a baffle extending transversely across said housing below said rake, an upwardly and rearwardly inclined baffle plate extending across said housing below said baffle and coacting therewith to direct the air blast upwardly against said rake in the rear of said drop to prevent heavy chaff from falling through the rear portion of the rake.

4. In a thresher, the combination with a housing having an open rear end, a horizontal chaffer spaced inwardly from said end, a tailings trough at the bottom and rear end of said housing, and a cleaner fan for directing an air blast upwardy and rearwardly relative to said chaffer and out of said end, of a tailings rake extending rearwardly from said chaffer out of said rear end, and having an intermediate downwardly and rearwardly inclined drop extending across the housing, and means in said housing forming with said drop a passageway for grain to drop through protected from said air blast to find the way to said trough, said means comprising a baffle extending transversely across said housing below said rake, an upwardly and rearwardly inclined baffle plate extending across said housing below said baffle and coacting therewith to direct the air blast upwardly against said rake in the rear of said drop to prevent heavy chaff from falling through the rear portion of the rake, and a depending baffle hinged to said first baffle and depending from the same for swinging adjustment to vary the force of the blast directed upwardly against said rake.

5. A tailings rake for a threshing machine comprising front and rear parallel sections laterally offset in different planes, a transversely extending central drop portion inclining obliquely of the plane of the rake between said sections and joining the same and prongs overhanging said drop portion in the plane of one section.

RAYMOND T. BECKMANN.